L. A. YOUNG.
SEAT BACK UPHOLSTERING.
APPLICATION FILED OCT. 30, 1915.
1,179,991.
Patented Apr. 18, 1916.
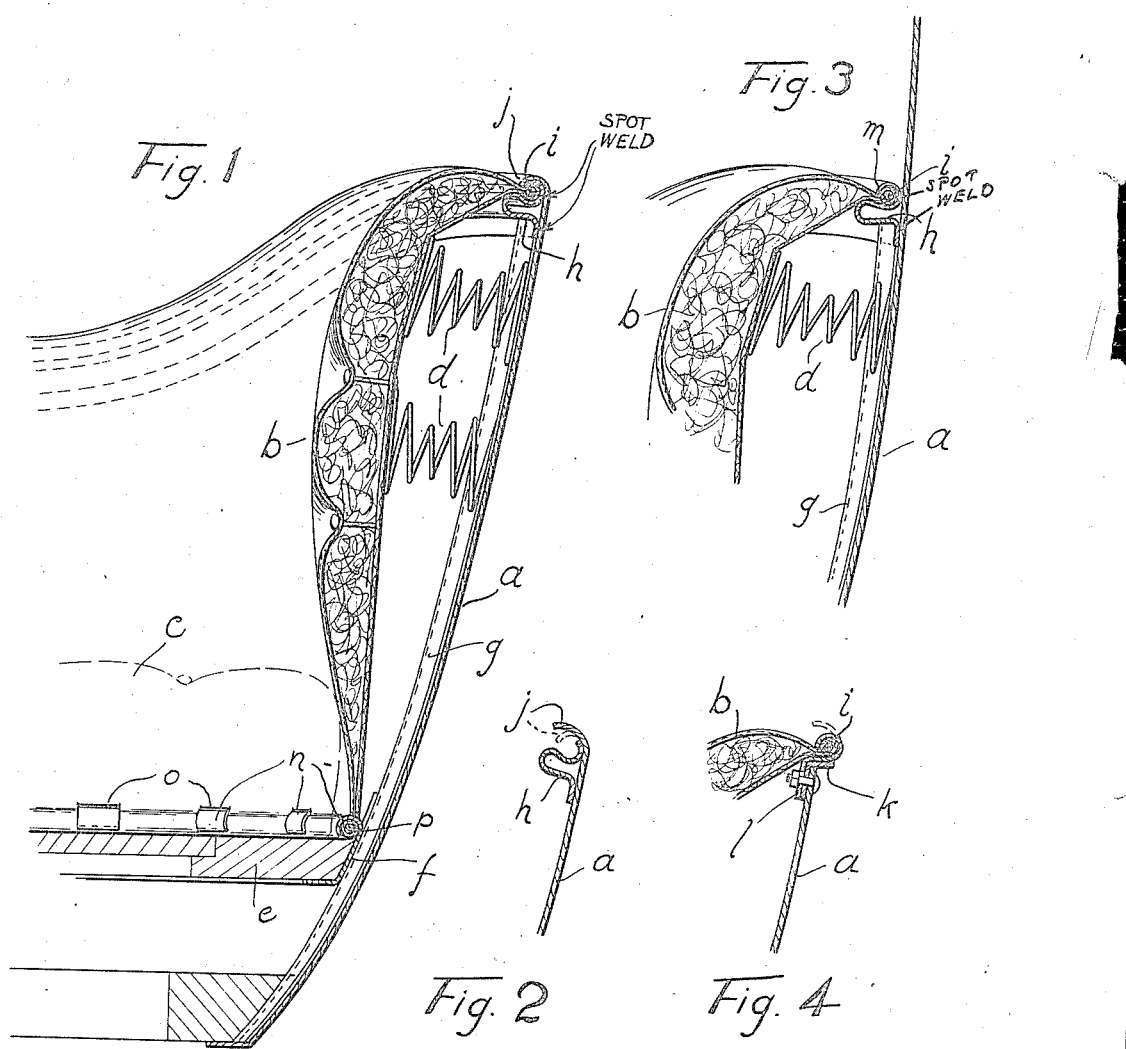

UNITED STATES PATENT OFFICE.

LEONARD A. YOUNG, OF DETROIT, MICHIGAN.

SEAT-BACK UPHOLSTERING.

1,179,991.　　　　Specification of Letters Patent.　　Patented Apr. 18, 1916.

Application filed October 30, 1915. Serial No. 58,735.

*To all whom it may concern:*

Be it known that I, LEONARD A. YOUNG, a citizen of the United States, residing at Detroit, county of Wayne, State of Michigan, have invented a certain new and useful Improvement in Seat-Back Upholstering, and declare the following to be a full, clear, and exact description of the same, such as will enable others skilled in the art to which it pertains to make and use the same, reference being had to the accompanying drawings, which form a part of this specification.

This invention relates to seat back upholstering and comprises an arrangement whereby the top of the seat back upholstering is clamped between an under supporting surface and an upper surface that is turned down upon the top of the upholstering to pinch it between the two surfaces. This avoids the necessity of tacking the upholstering to the trimming rail, and does away with the necessity of a trimming rail in a closed body. It also results in a much neater job.

In the drawings—Figure 1 is a vertical cross section of a seat back, a portion of the seat bottom, and the upholstering. Fig. 2 is a detail of the top of the seat back panel showing the arrangement of parts before the top surface is rolled down over the upholstering. Fig. 3 is a fragmentary vertical cross section similar to the showing of Fig. 1, but showing a modified form of my invention used in a closed body. Fig. 4 is a fragmentary view of the top of the seat back panel showing a further modification, the clamping bar being attached to the upholstering before it is inserted in the body. Fig. 5 is a detail view, showing how the bottom of the upholstering is clamped in place by turning over portions struck out from the seat-supporting strip. Fig. 6 is a detail in front elevation of the seat-supporting strip attached to the body.

$a$ designates the metal seat back panel of an automobile body, $b$ the upholstering cushion of the seat back, $c$ (showing in phantom) the seat cushion, $d$ the seat back springs. $e$ represents the seat frame which is supported by a seat-supporting strip $f$, which is spot-welded or otherwise secured to the vertical stiffening ribs $g$ which are preferably spot-welded to the metal seat back panel $a$. These stiffening ribs are channel bars as shown in Fig. 6.

In the open body I spot-weld a channel strip $h$ near the top of the seat back panel and on the inside thereof. This forms an under-supporting surface for the top of the upholstering cushion which is preferably provided with a border wire or cord $i$. The top edge of the upholstering cushion is laid on the top of this channel strip and the metal of the seat back panel is turned over to clamp the top edge of the cushion in place by means of a suitable tool, such for instance, as a rolling tool. This forms the turned-over edge designated $j$. This form of construction not only does away with the wooden trimming rail to which it has been customary to tack the backing and the leather facing of the upholstering, but it also forms a very neat finish for the top of the seat back by reason of furnishing a simple, neat joint between the upholstering and the body, and the upholstering does not project over the seat back panel.

In Fig. 4 I have shown a modified form of clamping the upholstering to the seat back. An angle iron strip $k$ is secured to the top of the metal seat back panel. The clamping strip $l$ may be clamped on the top edge of the upholstering before this is inserted in the body and then the upholstering and clamping strip $l$ may be removably secured in the seat back by the bolts and nuts $x$.

In Fig. 3 the clamping strip for both resting the top edges of the upholstering and clamping it in place is shown. This is particularly applicable for a closed body. In a closed body the seat back panel $a$ is continued up above to a level of the top of the upholstering. The channel bar strip $h$ is spot-welded to the inside of the metal seat back panel $a$ and is provided with an extended portion $m$ which may be turned over the top of the upholstering in the same manner that the top edge of the seat back panel is turned over the upholstering as shown in Fig. 1.

In Figs. 1, 5 and 6 a novel way of fastening the upholstering at the bottom is shown. In a great many bodies it is customary to hold the seat frame $e$ in place by a seat supporting strip $f$, which is here shown as spot-welded to the stiffening ribs $g$. Lips $n$ may be struck out of this seat-supporting strip as shown in Fig. 6. Before the upholstering is put into the body, it may be perforated with slits or slots $o$ (Fig. 5). By reason of these perforations the bottom edge of the upholstering may be fitted over the perpendicularly-projecting lips $n$ in the way shown in Fig. 5; the lips may then be turned down as shown in Fig. 1, and the upholstering will be securely held in place at the bottom without the necessity of tacking it as has heretofore been customary. I preferably provide a wire or cord $p$ in the bottom of the upholstering to reinforce the same.

What I claim is:

1. In a seat back, the combination of a seat back panel, an upholstering cushion, a strip secured thereto upon which to rest the top edge of the upholstering, and a metal edge portion turned over the upholstering to clamp the upholstering to the said strip upon which the upholstering rests.

2. In a seat back, the combination of a metal seat back panel, an upholstering cushion, a metal strip secured to the seat back for supporting the upholstering edge at the top, the top edge of the metal seat back panel being turned over the upholstering to clamp the same between such turned-over edge and the strip upon which the upholstering edge rests, substantially as described.

3. In a seat back, the combination of a seat back panel of metal, an upholstering cushion, and a strip homogeneously secured to the inside of the metal seat back panel at its top upon which the top edge of the upholstering may rest, the said top edge of the metal seat back panel being turned over the top edge of the upholstering to clamp the same between said turned-over edge and the said metal strip upon which the top edge of the upholstering rests.

4. In a seat back, the combination of a metal seat back panel, an upholstering cushion, a channel bar homogeneously connected with the top of the seat back panel upon its inside, the said top edge of the seat back panel being turned over to clamp the top edge of the upholstering between such turned-over edge and the said channel bar.

5. In a seat back, the combination of a metal seat back panel, a strip secured to the seat back panel at the top, and a metal turned-over edge portion above the said strip, the said strip and metal turned-over edge portion forming a groove in which the upper edge of the upholstering may be secured, substantially as described.

In testimony whereof, I sign this specification.

LEONARD A. YOUNG.